US012687108B1

(12) United States Patent
Liu et al.

(10) Patent No.: US 12,687,108 B1
(45) Date of Patent: Jul. 21, 2026

(54) SYSTEMS AND METHODS FOR DEFINING AND TRANSMITTING SUBSURFACE COMMANDS

(71) Applicant: Schlumberger Technology Corporation, Sugar Land, TX (US)

(72) Inventors: Qiuhua Liu, Houston, TX (US); Samba Ba, Houston, TX (US); Martin Jones, Stonehouse (GB); Jinsoo Kim, Houston, TX (US); Yaguang Gu, Houston, TX (US); Kostadin Buzov, Stonehouse (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/066,259

(22) Filed: Feb. 28, 2025

(51) Int. Cl.
| | |
|---|---|
| *E21B 47/18* | (2012.01) |
| *G01V 3/30* | (2006.01) |
| *G08B 21/18* | (2006.01) |

(52) U.S. Cl.
CPC ................ *E21B 47/18* (2013.01); *G01V 3/30* (2013.01); *G08B 21/18* (2013.01)

(58) Field of Classification Search
CPC ............ E21B 47/18; G01V 3/30; G08B 21/18
See application file for complete search history.

(56) References Cited

U.S. PATENT DOCUMENTS

| | | | | |
|---|---|---|---|---|
| 10,579,231 | B1 * | 3/2020 | Valleru ................. | G06F 3/0482 |
| 11,674,375 | B2 | 6/2023 | Yu | |
| 11,901,800 | B1 * | 2/2024 | Al-Mousa ............... | E21B 3/022 |
| 12,078,048 | B2 | 9/2024 | Yu | |
| 2021/0026030 | A1 * | 1/2021 | Dixon ...................... | G01V 1/34 |
| 2021/0231007 | A1 | 7/2021 | Joseph | |
| 2021/0372243 | A1 * | 12/2021 | Arukhe ................... | F03G 7/122 |
| 2022/0197490 | A1 | 6/2022 | Feinstein | |
| 2023/0392447 | A1 | 12/2023 | Ignova | |
| 2025/0084750 | A1 * | 3/2025 | Wu ......................... | E21B 44/00 |
| 2025/0129702 | A1 | 4/2025 | Ba | |
| 2025/0148258 | A1 * | 5/2025 | Jones ..................... | G06N 3/006 |
| 2025/0270924 | A1 | 8/2025 | Ba | |
| 2025/0270925 | A1 | 8/2025 | Ba | |

OTHER PUBLICATIONS

Wu, Y. et al., "Design of Electric Actuator Control System Based on Internet of Things", 2022 4th International Conference on Intelligent Control, Measurement and Signal Processing, 2022, 4 pages.

* cited by examiner

*Primary Examiner* — Amine Benlagsir
(74) *Attorney, Agent, or Firm* — Kyle R. Miiller

(57) ABSTRACT

A method may include receiving a selection of a command of a plurality of commands, where the command is part of the plurality of commands and is associated with controlling one or more operations of a downhole tool, and where the plurality of commands is organized according to a JavaScript Object Notation (JSON) schema. The method may also include generating a downlink signal based on the command and transmitting the downlink signal to the downhole tool when the downhole tool is disposed within a wellbore of a geological formation, where the downhole tool is configured to implement a change in the one or more operations in response to receiving downlink signal. The method may further include receiving feedback data from the downhole tool after the downhole tool implements the command, where the feedback data includes one or more measurements associated with the downhole tool implementing the command.

20 Claims, 7 Drawing Sheets

```
           JSON  CONTRACT  FOR  HOLD  VERTICAL  MODE
"CommandId": "2-30"
"CommandDescription": "Go to Page 1: Hold Vertical Mode"
"DrillCycleNumber": 0,
"BitConditions": [],
"ValueConditions": [],
"ValueOperations": [
      {
         "AssignmentType": "Absolute",
         "BitConditions": [],
         "ValueConditions": [],
         "DPointName": "TFDS",                              } 252
         "Value": 3.141592653589794,
         "Min": 3.141592653589794,
         "Max": 3.141592653589794
      },
      {
         "AssignmentType": "Absolute",
         "BitConditions": [],
         "ValueConditions": [],
         "DPointName": PRDS",                               } 252
         "Value": 1.0,
         "Min": 1.0,
         "Max": 1.0
      }
],
"BitOperations": [
      {
         "BitConditions": [],
         "ValueConditions": [],
         "DPointName": "RTSTAT",
         "MaskingBits": 3584,                               } 252
         "Value": 512,
         "Description": "Go to Vertical (PowerV) Mode"
      },
      {
         "BitConditions": [],
         "ValueConditions": [],
         "DPointName": "DLKPAGE",
         "MaskingBits": 7,,                                 } 252
         "Value": 1,
         "Description": "Go to Page 1"
      },
      {
         "BitConditions": [],
         "ValueConditions": [],
         "DPointName": "RTSTAT",
         "MaskingBits": 2,                                  } 252
         "Value": 0,
         "Description": "Set to GTF"
      }
],
```

SYSTEMS AND METHODS FOR DEFINING AND TRANSMITTING SUBSURFACE COMMANDS

BACKGROUND

The present disclosure generally relates to systems and methods for defining, organizing, and communicating commands to downhole tools. More specifically, the disclosure relates to employing JavaScript Object Notation (JSON) contracts to define and organize commands for a variety of downhole tools.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Controlling and operating a downhole tool for the discovery and accumulation of hydrocarbons (e.g., oil and gas) is a complex process. An inherent consequence of subsurface drilling is that various petrophysical variables impact the ability of the downhole tool to perform certain tasks. For example, changes in pressure, resistivity, groundwater levels, or the status of the downhole tool may call for the downhole tool to change speed, direction, function, or the like. A surface level operating system may be used to communicate with the downhole tool to implement these changes. For example, the surface level operating system may send commands to the downhole tool to cause the changes and receive data from the downhole tool to confirm that the changes were implemented.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with an embodiment, a method may include receiving, via a processing system, a selection of a command of a plurality of commands, where the command is part of the plurality of commands and is associated with controlling one or more operations of a downhole tool, and where the plurality of commands is organized according to a JavaScript Object Notation (JSON) schema. The method may also include generating, via the processing system, a downlink signal based on the command and transmitting, via the processing system, the downlink signal to the downhole tool when the downhole tool is disposed within a wellbore of a geological formation, where the downhole tool is configured to implement a change in the one or more operations in response to receiving downlink signal. The method may further include receiving, via the processing system, feedback data from the downhole tool after the downhole tool implements the command, where the feedback data includes one or more measurements associated with the downhole tool implementing the command.

In accordance with an embodiment, a system may include a downhole tool and a surface operating system that includes processing circuitry. The surface operating system may receive a selection of a command of a plurality of commands, where the command is part of the plurality of commands and is associated with controlling one or more operations of a downhole tool, and where the plurality of commands is organized according to a JavaScript Object Notation (JSON) schema. The surface operating system may also generate a downlink signal based on the command. The surface operating system may transmit the downlink signal to the downhole tool when the downhole tool is disposed within a wellbore of a geological formation, where the downhole tool is configured to implement a change in the one or more operations in response to receiving downlink signal. Additionally, the surface operating system may receive feedback data from the downhole tool after the downhole tool implements the command, where the feedback data includes one or more measurements associated with the downhole tool implementing the command.

In accordance with an embodiment, a non-transitory, computer-readable medium, including computer-readable instructions that, when executed by one or more processors of one or more computers, may cause the one or more computers to receive a selection of a command of a plurality of commands, where the command is part of the plurality of commands and is associated with controlling one or more operations of a downhole tool, and where the plurality of commands is organized according to a JavaScript Object Notation (JSON) schema. The computer-readable instructions may also cause the one or more computers to generate a downlink signal based on the command and transmit the downlink signal to the downhole tool when the downhole tool is disposed within a wellbore of a geological formation, where the downhole tool is configured to implement a change in the one or more operations in response to receiving downlink signal. Further, the computer-readable instructions may cause the one or more computers to receive feedback data from the downhole tool after the downhole tool implements the command, where the feedback data includes one or more measurements associated with the downhole tool implementing the command.

The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 is an example of a JSON contract, including various properties associated with a command, in accordance with an embodiment of the present disclosure.

DETAILED DESCRIPTION

Figure 1:
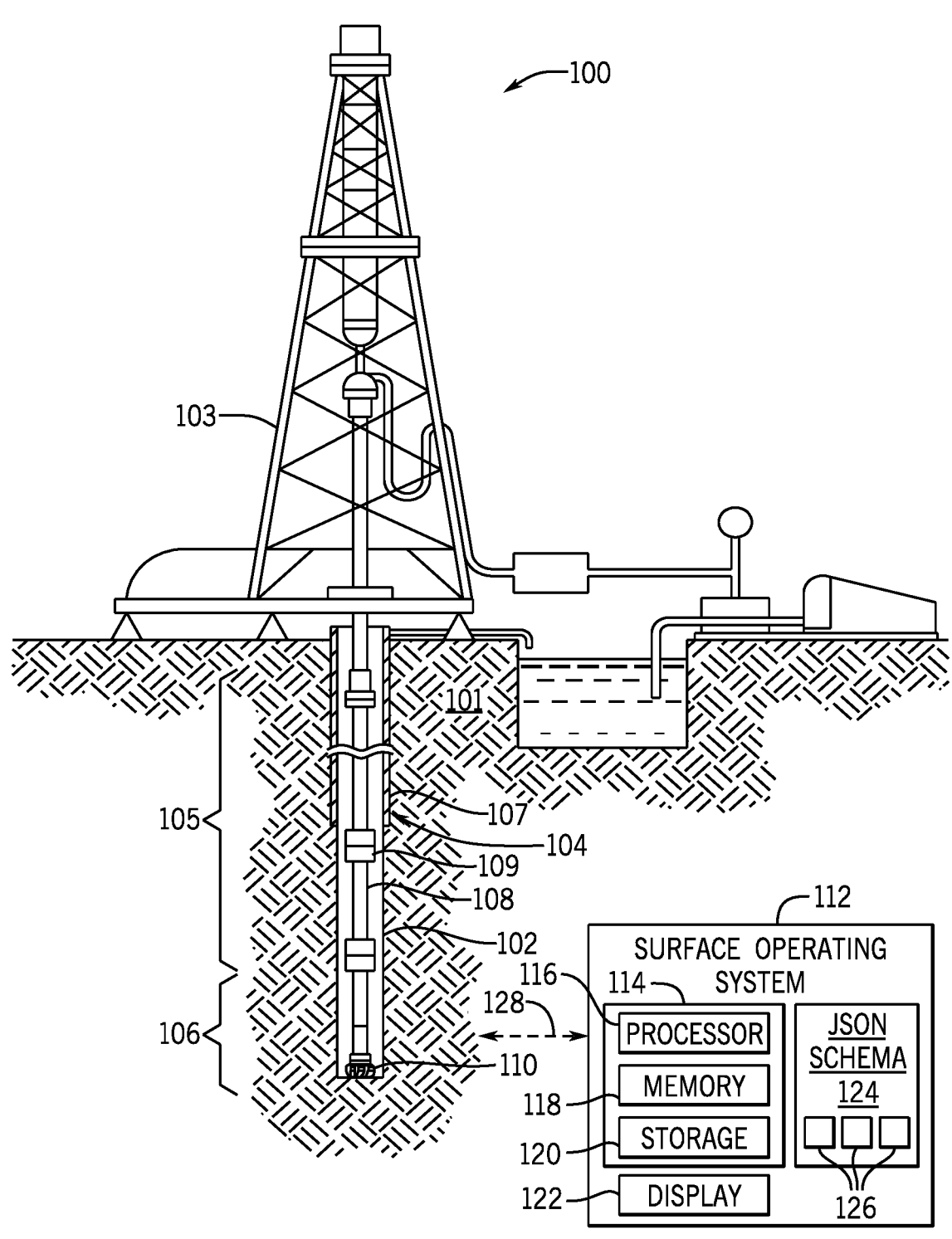
FIG. 1 is a diagram providing an example of a downhole tool in a subsurface formation communicatively connected to a surface operating system, in accordance with an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Commands for controlling the operation of a downhole tool may be structured and stored on a surface operating system as Extensible Markup Language (XML) strings. XML is a text-based programming language that is both human and machine readable. A surface operating system may receive and process XML strings to generate downlink signals (e.g., machine-readable pulses, analog signals, radio waves), which may be transmitted to the downhole tool. XML strings may include a single line that indicates a steering mode for the downhole tool. Thus, the XML strings may not indicate any prerequisite conditions associated with the command. Instead, the domain knowledge of the surface operating system may be relied upon for that determination. Likewise, the XML strings may not indicate any relevant data points for the surface operating system to analyze regarding the downhole tool's performance of commands. The domain knowledge of the surface operating system may also have been relied upon for that determination.

After receiving the downlink signal, the downhole tool may attempt to execute the command and transmit performance data back to the surface operating system. In an XML-based system, the surface operating system may receive data from the downhole tool and then may parse the received data to determine whether the status of the downhole tool satisfied the prerequisites conditions for performing the command. After confirming that the prerequisite conditions were met, the surface operating system may determine whether the downhole tool performed the command after the downlink was sent to the downhole tool.

Parsing the data received from the downhole tool may be challenging for the surface operating system because the surface operating system may not be able to identify relationships between the data that it received from the downhole tool and the downhole tool's performance of a command. That is, XML-based commands may not provide the surface operating system with any indication of the type of data that should be analyzed before or after transmitting a downlink to the downhole tool. The surface operating system may attempt to determine the relevant data (e.g., based on domain knowledge, hard coding) and then analyze that data to glean information about the downhole tool. However, because the commands were based on single XML strings, there may not be an efficient way to accurately identify relationships between the received data and the transmitted commands. This process may lead to inefficient and/or inaccurate evaluations regarding the status of the downhole tool, thereby impacting the ability of the surface operating system to determine whether the prerequisite conditions for a command had been met. Likewise, the surface operating system may not be able to evaluate the received data to efficiently select additional commands, which may impact its ability to manipulate the downhole tool to achieve a desired goal (e.g., finding hydrocarbon reservoirs).

With the foregoing in mind, the present disclosure relates to systems and methods for efficiently defining, organizing, and communicating commands to downhole tools. More specifically, the disclosure relates to employing JavaScript Object Notation (JSON) contracts to define commands for a variety of downhole tools. A JSON contract may include a collection of various JSON objects that define a specific command. The JSON objects may be specific properties of a command (e.g., steering modes, conditions, data points) that, when taken together, may provide the surface operating system with relevant details about the command. The JSON contracts may be stored in a multi-layered JSON schema to organize commands (e.g., holding an inclination, initiating a turn) in a defined structure according to various properties of the commands. Structuring commands as JSON contracts may enable computing systems, such as the surface operating system, to analyze data received from the downhole tool and automatically select additional commands based on the received data. Moreover, organizing commands according to a multi-layered JSON schema may improve the efficiency of defining commands, determining which commands to transmit to the downhole tools, and communicating the downlink signals associated with the commands to the downhole tools.

In an embodiment, the JSON contracts may be organized according to a multi-layered JSON schema. The JSON schema may be viewed as a hierarchical map for defining and organizing commands according to a variety of properties associated with the downhole tool, drilling conditions, drilling operations, and the like. The first level of the JSON schema may specify properties of the downhole tools. This level may include tool families, firmware versions of the tools, the contract versions, command groups, and the like. The second level of the JSON schema may correspond to command groups. Commands may be grouped according to their desired effects. The command group level may include the names of the command groups, the corresponding data points associated with the command groups, the pages associated with the command groups, and the like. The third level of the JSON schema may include command pages. This level may identify particular commands that may be sent to the downhole tool. The commands may be stored as pages so that they may be organized according to common characteristics of the commands (e.g., expected behavior of the downlink commands). For example, each page may store commands with common properties, such as a page applicable to when the steering mode is in a hold inclination azimuth (HIA) mode. This level may include a page identification number for each command in the command group, a data point associated with the command page, a description of a steering mode associated with the command page, a detailed description of the command, and the like. The fourth level of the JSON schema may be the detailed description of the commands. This level may contain the steering modes, conditions, and data points associated with a command. For example, the detailed description of the command level may define the drilling conditions appropriate for the command, the instructions for the downhole tool to perform the command, and the like.

A benefit of the JSON contracts may include defining uniform commands for various downhole tools. That is, rather than having dedicated XML collections for each downhole tool, the JSON schema may define commands for different downhole tools and different versions of downhole tools. Similarly, rather than having to retrieve the commands from separate systems (e.g., systems or databases associated with each downhole tool), the JSON contract may enable the surface operating system to select and receive commands for a variety of different downhole tools without coordinating with separate systems, thereby reducing the computational tasks associated with performing the embodiments described herein. Because commands may be structured according to a uniform JSON format, the surface operating system may efficiently parse the commands according to a single support system (e.g., a library). This may increase communication efficiency, as the surface operating system may be able to transmit commands to different types or versions of downhole tools from a single location. For example, the surface operating system may be able to control two different types of downhole tools simultaneously from a common location.

A further benefit of the JSON contract may relate to autonomous drilling. Autonomous drilling, such as drilling that employs artificial intelligence (AI) and machine learning algorithms, may provide desirable benefits in subsurface drilling. AI algorithms may be better suited to categorize and analyze JSON contracts than commands based on an XML string. For example, the JSON contract may define datapoints (referred to in the industry and hereinafter as "DPoints") that may be associated with the downhole tool's performance of a command. That is, the surface operating system may receive communications from the downhole tool regarding certain natural properties (e.g., subsurface temperature measurements) and tool characteristics (e.g., the speed of the downhole tool, the depth of the downhole tool, the angle at which the downhole tool is travelling). The DPoints may be viewed as indicators of the downhole tool's ability to perform certain commands. Similarly, the DPoints may be viewed as indicators of the downhole tool's performance of a transmitted command. For example, the DPoint for a command associated with a sharp turn may be the downhole tool's facial direction relative to true north after a time period of the surface operating system sending the downlink signal to the downhole tool. In this way, certain DPoints may be viewed as an expected response to the downhole tool performing a downlink command.

Structuring commands as JSON contracts with defined DPoints may enable the surface operating system to efficiently identify the relationship between data that it receives from the downhole tool and a particular command it may have transmitted. In some cases, when the surface operating system receives DPoints, AI algorithms may be used to analyze the downhole tool's performance of commands. That is, by defining the DPoints for each JSON contract, the surface operating system may employ AI algorithms to perform various tasks related to the selection and organization of commands. For example, AI algorithms may be used to define additional conditions for commands, determine subsequent commands to control the downhole tool, identify that the downhole tool is experiencing issues performing a particular command, or the like.

With the foregoing in mind, FIG. 1 is a diagram of a downhole system 100 where a downhole tool 106 may be communicatively connected to a surface operating system 112. The downhole system 100 may relate to drilling in an earth formation 101 to form a wellbore 102. It should be noted that although the downhole system 100 provided in FIG. 1 may relate to a directional drilling operation, other downhole systems (e.g., a downhole system related to electromagnetic mapping tools) may employ the systems and methods of this disclosure. Continuing with the description of FIG. 1, the downhole system 100 may include a drill rig 103 that may be used to turn a drilling tool assembly 104, which extends downward into the wellbore 102 surrounded by casing 107. The drilling tool assembly 104 may include a drill string 105, and a downhole tool 106. In some embodiments, the downhole tool 106 may be referred to as a bottomhole assembly ("BHA"), and it may include a bit 110 for facilitating drilling operations.

The drill string 105 may include several joints of drill pipe 108 connected end-to-end through tool joints 109. The drill string 105 may transmit drilling fluids through a central bore and transmit rotational power from the drill rig 103 to the BHA 106. In some embodiments, the drill string 105 may also include additional downhole drilling tools and/or components such as subs, pup joints, etc. For example, the drill pipe 108 may provide a hydraulic passage through which drilling fluid may be pumped from the surface. The drilling fluid may be discharged through selected-size nozzles, jets, or other orifices in the bit 110 for the purposes of cooling the bit 110 and cutting structures thereon, and for lifting cuttings out of the wellbore 102 as it is being drilled.

The downhole tool 106 may be any suitable operating machine with the capability to receive and process downlink signals. Examples of downhole tools 106 may include drill collars, stabilizers, measurement-while-drilling ("MWD") tools, logging-while-drilling ("LWD") tools, downhole motors, underreamers, section mills, hydraulic disconnects, jars, vibration or dampening tools, and other components or combinations of the foregoing.

The downhole tool 106 may further include a rotary steerable system (RSS). The RSS may include directional drilling tools that change a direction of the bit 110, and thereby the trajectory of the wellbore 102. At least a portion of the RSS may maintain a geostationary position relative to an absolute reference frame, such as gravity, magnetic north, true north, and the like. Using measurements obtained with the geostationary position, the RSS may locate the bit 110, change the course of the bit 110, and direct the directional drilling tools on a projected trajectory. The RSS may be implemented to direct the bit 110 in accordance with or based on a trajectory for the bit 110. For example, a trajectory may be determined for directing the bit 110 toward one or more subterranean targets such as an oil or gas reservoir. The RSS may be controlled in accordance with commands or instructions that are, for example, transmitted to the RSS via downlinks from a surface operating system 112. Through downhole telemetry techniques, the RSS may communicate various information back to the surface.

The surface operating system 112 may direct the RSS to control the operation of the downhole tool 106. The surface operating system may do so by communicating with the downhole tool 106 via various communication components (e.g., the components described in detail with reference to FIG. 2). For example, the downhole tool 106 may include an electromagnetic (EM) acquisition system that may contain sensors for measuring and recording data associated with various properties of the earth formation 101, the wellbore 102, and the like. The downhole tool 106 may contain various other sensors, which may be included in or separate from the EM acquisition system, such as torque sensors, pressure sensors, temperature sensors, accelerometers, gyroscopes, magnetometers, and the like. These sensors may be used by the downhole tool 106 to collect and aggregate data related to the geographical formation 101, the wellbore 102, the status and conditions of the downhole tool 106, and the like. As described in more detail with reference to FIG. 3, the surface operating system 112 may receive the data that may be recorded by these sensors from the downhole tool 106 as feedback data related to the downhole tool's 106 current conditions, its performance of commands, and the like. In some embodiments, the surface operating system 112 may analyze the feedback data for DPoints associated with the performance of a transmitted downlink signal, the downhole tool's status with respect to a compatibility to perform additional commands (e.g., based on one or more conditions of those additional commands), and the like.

The surface operating system 112 may select/receive commands, transform the commands to downlinks, and transmit the downlinks to the downhole tool 106. This process may be used to control the steering of the downhole tool 106. In some embodiments, the surface operating system 112 may receive information from the downhole tool 106. For example, the surface operating system 112 may receive data from the downhole tool 106 that is associated with a status of the RSS. Receiving data from the downhole tool 106 may enable the surface operating system 112 to determine, for example, whether the RSS is implementing the commands that it is attempting to transmit to the downhole tool 106.

Communications 128, such as the downlink signals, may be transmitted from the surface operating system 112 to one or more downhole tools, and communications 128, such as data signals related to the performance of commands, wellbore conditions, or the like, may be returned to the surface operating system 112 from the downhole tool 106. The surface operating system 112 also may be described as a control system, which may include a controller 114 to facilitate communicating with and controlling the operations of various downhole and surface components of the drilling system 100. The surface operating system 112 may be any suitable electronic processing system that can be used to carry out the systems and methods of this disclosure. For example, the controller 114 of the surface operating system 112 may include one or more processors 116, which may execute instructions stored in memory 118 and/or storage 120. The memory 118 and/or the storage 120 of the surface operating system 112 may be any suitable article of manufacture that can store instructions. In certain embodiments, the one or more processors 116 may include a microprocessor, a microcontroller, a processor module or subsystem, a programmable integrated circuit, a programmable gate array, a digital signal processor (DSP), or another control or computing device. In certain embodiments, the one or more processors 116 may include machine learning and/or artificial intelligence (AI) based processors.

In certain embodiments, the memory 118 and storage 120 may be implemented as one or more non-transitory computer-readable or machine-readable storage media. In certain embodiments, the memory 118 may include one or more different forms of memory, including semiconductor memory devices such as dynamic or static random access memories (DRAMs or SRAMs), erasable and programmable read-only memories (EPROMs), electrically erasable and programmable read-only memories (EEPROMs) and flash memories. The storage 120 may include solid state drives, magnetic disks such as fixed, floppy and removable disks; other magnetic media including tape; optical media such as compact disks (CDs) or digital video disks (DVDs); or other types of storage devices. Note that the commands may be provided on one computer-readable or machine-readable storage medium of the memory 118 or the storage 120, or alternatively, may be provided on multiple computer-readable or machine-readable storage media distributed in a large system having possibly plural nodes. Such computer-readable or machine-readable storage medium or media may be considered to be part of an article (or article of manufacture), which may refer to any manufactured single component or multiple components. In certain embodiments, the storage 120 may be located either in the machine running the machine-readable instructions or may be located at a remote site from which machine-readable instructions may be downloaded over a network for execution. In certain embodiments, the controller 114 may include instructions stored on the memory 118 and/or storage 120 and executable by the processor 116 to perform various aspects of receiving and translating data from the downhole tools 106, receiving or selecting a command for the downhole tool, translating the command from an organized JSON-based syntax into a downlink signal for the downhole tool 106, and processing transmitted and received data via artificial intelligence technology (e.g., machine learning methods, deep learning neural networks).

The surface operating system 112 may also include a display 122, which may be any suitable electronic display that may display outputs generated by the one or more processors 116. The surface operating system 112 may be a local component of the downhole system 100 (e.g., located at the surface), a device located in proximity to the downhole system 100, and/or a remote data processing device located away from the downhole system 100. The surface operating system 112 may process downhole measurements in real time or sometime after the data has been collected. In some embodiments, the surface operating system 112 may be a portable computing device (e.g., tablet, smart phone, or laptop) or a server that is remote from the downhole system 100. In some embodiments, the downhole tools 106 may store and process collected data, and transmit the data to the surface for processing via communications 128 described above, including any suitable telemetry (e.g., electrical signals pulsed through a region of the geological formation 101 or mud pulse telemetry using the drilling fluid).

Figure 2:
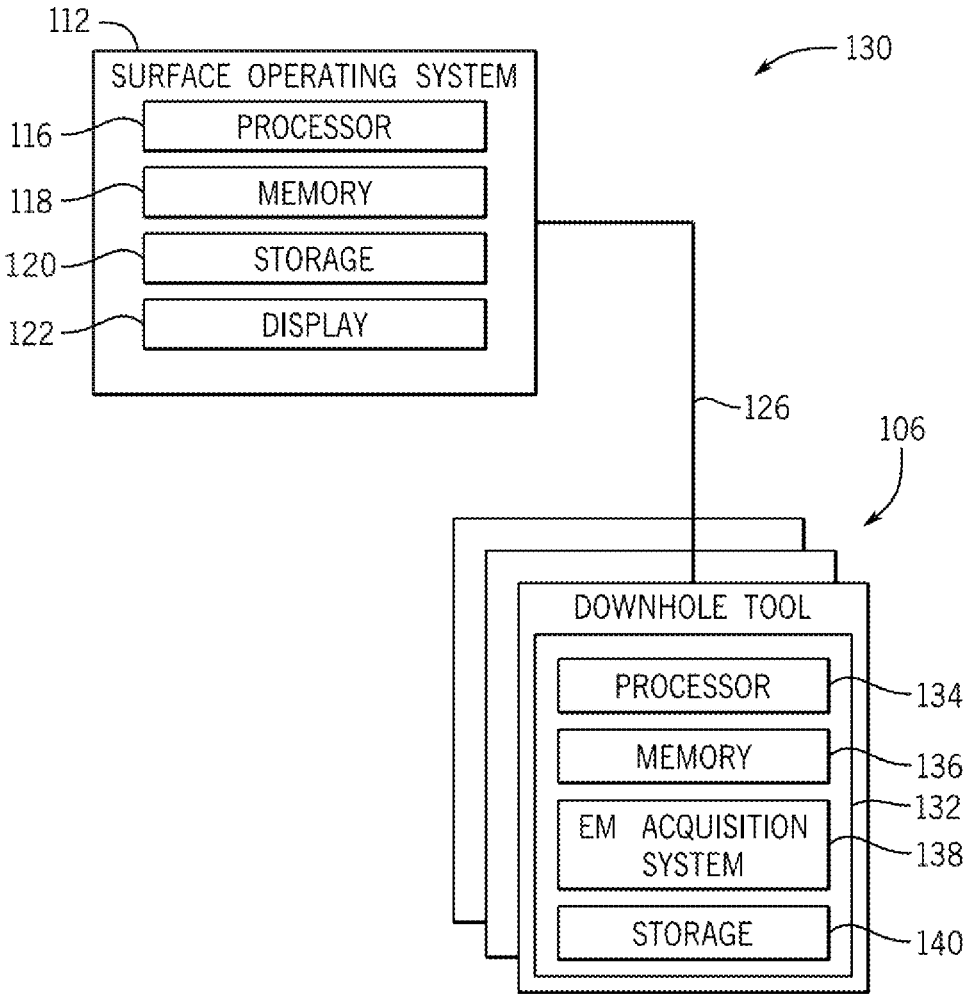
FIG. 2 is a block diagram depicting components of a surface operating system and one or more downhole tools, in accordance with an embodiment of the present disclosure.

FIG. 2 illustrates a block diagram of communication components 130 to facilitate communication 128 between the surface operating system 112 and the one or more downhole tools 106. In the illustrated embodiment, each downhole tool 106 may have a controller 132, which may include a processor 134, memory 136, an EM acquisition system 138, and storage 140. The controller 132 may include instructions stored on the memory 136 and/or storage 140 and executable by the processor 134 to perform various commands, acquire data during the performance of the commands, and the like. In some embodiments, the processor 134 may be an application specific integrated circuit (ASIC), a field programmable gate array (FPGA), a micro control unit (MCU), a digital signal processor (DSP), or the like. The downhole tool 106 may communicate with the surface operating system 112 via a data cable, telemeter or other suitable techniques. For example, the downhole tool 106 may communicate EM measurements obtained by an EM sensor (or meter) as part of the EM acquisition system 138. In turn, the processor 116 of the surface operating system 112 may determine certain parameters (e.g., porosity, water saturation, permeability, velocities, resistivity, lithology, density, and so forth) based on the EM measurements. In such embodiments, the EM acquisition system 138 may include an emission source (e.g., an antenna) to acquire, obtain, or otherwise measure EM measurements.

Referring back to FIG. 1, the surface operating system 112 may receive data from the downhole tool 106 and transmit data to the downhole tool 106. For instance, the surface operating system 112 may transmit downlink signals to the downhole tool 106 via the communication channel 128. To facilitate communication with the downhole tool 106, the surface operating system 112 may include a JSON schema 124. The JSON schema 124 may be an organized collection of various JSON contracts 126. The JSON contracts 126 may define commands as collections of JSON objects. The JSON schema 124 may be a multi-layered storage system that organizes JSON objects according to various characteristics associated with the commands, the particular downhole tool 106 that the command is being transmitted to, and any other suitable characteristics (e.g., commands may be organized based on recency, frequency of use, artificial intelligence-based suggestions).

Returning to FIG. 2, in certain embodiments, after a command has been selected for transmission to the downhole tool 106, the one or more processors 116 of the surface operating system 112 may retrieve the associated JSON contract 126 and extract certain details from the JSON contract 126 to generate downlink signals. The downlink signals may be communicated to the downhole tool 106 via the communication channel 128 to be executed by the one or more processors 134 of downhole tool 106.

Figure 3:
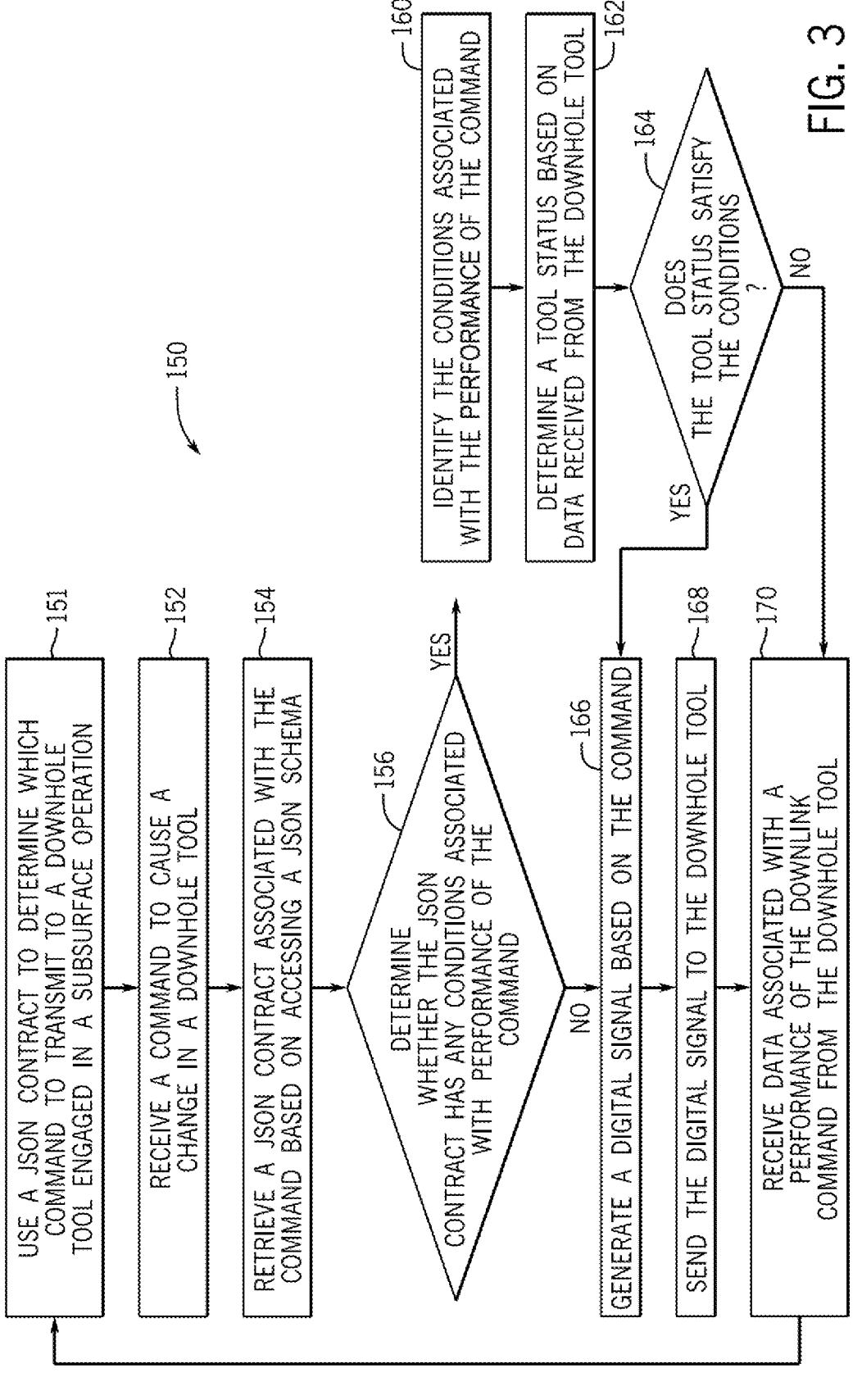
FIG. 3 is a flowchart diagram of a method of using a JavaScript Object Notation (JSON) contract to transmit a command to the downhole tool, in accordance with an embodiment of the present disclosure.

In some embodiments, the JSON contracts 126 may be used to control various types, versions, and/or brands of downhole tools. FIG. 3 provides a flowchart diagram of a method 150 of using the JSON contracts 126 to receive a command and transmit a downlink signal to a specific downhole tool 106. Although the following description of the method 150 is described as being performed by the surface operating system 112, it should be noted that any suitable device capable of receiving and processing data may perform the method 150 described herein. In addition, although the method 150 is described in a particular order, it should be understood that the method 150 may be performed in any suitable order and may exclude one or more of the blocks described herein.

At block 151, the surface operating system 112 may use a JSON contract 126 to determine which command to transmit to a downhole tool 106 engaged in a subsurface operation. The subsurface operation may be any specified goal (e.g., locating hydrocarbon reservoirs, mapping a subsurface formation) of the downhole tool 106 when it is disposed within the geographical formation 101. As described with reference to block 170, the surface operating system 112 may receive various types of data (e.g., geological data, performance data) from the downhole tool 106 while it is in the geographical formation 101. The surface operating system may analyze the received data and use one or more JSON contracts 126 included in the JSON schema 124 to determine a command to transmit to the downhole tool 106 to advance the specified subsurface operation.

At block 152, the surface operating system 112 may receive the command. The surface operating system 112 may receive the command based on a user input received via an input device, the display 122, or the like. For example, a graphical user interface (GUI) on the display 122 of the surface operating system 112 may contain various affordances for a user to select commands. Alternatively, the user may be able to input certain commands by typing text-based strings associated with commands into the surface operating system 112, speaking commands to the surface operating system 112, or through any other suitable means that enable user input. In some embodiments, the command may be selected directly from the JSON schema 124. Alternatively, the command may be selected by an automated process. For example, certain commands may be automatically selected in response to detecting certain conditions that may be present (e.g., DPoints that the surface operating system 112 receives from the downhole tool 106). In other embodiments, artificial intelligence algorithms may be used to select commands based on patterns of previously selected commands and corresponding conditions. As described with reference to FIG. 2, the surface operating system 112 may receive data (e.g., DPoints) about one or more downhole conditions from the EM acquisition system 138. An artificial intelligence system may be trained to automatically select commands based on the natural conditions of the earth formation 101, the status of the downhole tool 106, an intended goal of the downhole tool 106 (e.g., searching for hydrocarbons), or the like. In these embodiments, the JSON schema 124 may provide a benefit related to selecting the command. For example, the JSON schema 124 may provide software systems (e.g., systems for automatically selecting commands) with an organized structure to define behaviors of the commands and insight into the current tool status in relation to the behaviors of the commands.

Turning to block 154, the surface operating system 112 may retrieve the JSON contract 126 associated with the selected command. The JSON contract 126 may be retrieved from a local storage location (e.g., memory or storage of the surface operating system 112), a remote storage location (e.g., a remote server or data center), a cloud-based data system, or the like. Each JSON contract 126 may be made up of various JSON objects that define various properties of the command. For example, one JSON contract 126 may include a page that defines bit conditions to identify and evaluate before affecting a change in the direction of the drill bit 110 of the downhole tool 106. The conditions of the JSON contract 126 may differ depending on the type of downhole tool 106, the firmware version of the downhole tool 106, the age of the downhole tool 106, or the like. Thus, after a command is received, the surface operating system 112 may retrieve the JSON contract 126 from the JSON schema 124.

FIG. 7 provides an example 250 of a JSON contract 126. Specifically, FIG. 7 depicts the JSON contract 126 for the command "hold vertical mode." As described above, the JSON contract 126 is an accumulation of different JSON objects 252 that define the command. For example, the JSON contract presents a Command ID associated with the page identification number for the command. The Command ID may specify the downlink signal that is sent to the downhole tool 106. The JSON contract 126 also contains various objects 252 that specify the properties of the commands (e.g., conditions and DPoints), which may be used by the surface operating system 112 for determining when to send commands, what commands to select, or any combination thereof. For example, the value operations and bit operations both contain various JSON objects 252 that define the conditions and DPoints associated with the "hold vertical mode" command.

Returning to FIG. 3, at decision block 156, the surface operating system 112 may determine if the JSON contract 126 is associated with any conditions. As discussed in detail with reference to FIGS. 4-6, each command may be accompanied by certain conditions. Certain commands may have no conditions. Some commands may have one condition. Other commands may have multiple conditions. Conditions may be any prerequisite to the downhole tool 106 performing the command, such as a measured temperature of the downhole tool 106, a calculated resistivity of the earth formation 101, or the like. Because the conditions may be part of the JSON contract 126, the surface operating system 112 may read the JSON contract 126 to determine whether any conditions exist.

If there are no conditions associated with the JSON contract 126, the surface operating system 112 may continue to block 166. If the received command is associated with any conditions, the surface operating system 112 may continue to block 160. At block 160, the surface operating system 112 may read (e.g., parse) the JSON contract 126 to determine the conditions that are associated with performing the command.

At block 162, the surface operating system 112 may determine the status of the downhole tool 106. The surface operating system 112 may do this by analyzing data that is received from the downhole tool 106. As depicted in FIG. 7, the conditions may be associated with certain DPoints. The surface operating system 112 may receive data from the downhole tool 106 and identify relevant portions of the data according to the DPoints. For example, the surface operating system 112 may analyze DPoints regarding the current direction of the drill bit 110 of the downhole tool 106. Likewise, the surface operating system 112 may determine whether any contradictory commands are currently being processed by the downhole tool 106 or are concurrently being performed and have not yet been completed. The surface operating system 112 may determine current depth of the downhole tool relative to the surface of the wellbore 102. Further, the surface operating system 112 may determine internal and/or external temperatures of the downhole tool 106. These examples illustrate that the surface operating system 112 may use the DPoints to identify and determine various characteristics of the software operations, hardware operations, and current environment of the downhole tool 106. In some embodiments, the downhole tool 106 may continuously or periodically transmit data to the surface operating system 112 throughout this method 150.

At decision block 164, the surface operating system 112 may determine whether the status of the downhole tool 106 satisfies the conditions associated with the command. The surface operating system 112 may compare the data obtained from the DPoints with the conditions. In some embodiments, the surface operating system 112 may compare the status of the downhole tool 106 with the command conditions at subsequent intervals (e.g., ten seconds later, one minute later, and so on).

If the downhole tool's 106 current status does not satisfy or otherwise conflicts with the command conditions, the surface operating system 112 may not send a downlink to the downhole tool 106. Instead, the surface operating system 112 may generate an alert (e.g., a GUI alert, a haptic alert) specifying that the current status of the tool does not satisfy the command conditions. The alert may suggest one or more alternative commands based on a similarity to the unsatisfied command, the current status of the downhole tool 106 (e.g., the one or more conditions of the alternative command satisfy the current status of the downhole tool 106), or the like. The downhole tool 106 may maintain its current status, and the surface operating system 112 continues to block 170.

If the status of the downhole tool 106 satisfies the command conditions, the surface operating system 112 may continue to block 166. As mentioned above, the surface operating system 112 may have moved directly from block 156 to block 166 after determining that the JSON contract did not have any conditions associated with the performance of the command at block 156.

At block 166, the surface operating system 112 may generate one or more digital signals based on the JSON contract 126. The downhole tool 106 may not be able to process JSON syntax. Certain downhole tools 106 may, for example, be limited to being able to communicate with downlink signals (e.g., binary pulses). Therefore, the surface operating system 112 may generate downlink signals based on at least part of the JSON contract 126. For example, the surface operating system 112 may generate the downlink signal according to information (e.g., the Command ID in FIG. 7) in the JSON contract 126. As described above, the downlink signals may be any suitable signal, group of signals, or set of instructions that the downhole tool 106 can receive, store, and process.

Moving to block 168, the surface operating system 112 may transmit the downlink signal to the downhole tool 106. This communication may occur by way of any suitable communication channel 128 that communicatively connects the surface operating system 112 with the downhole tool 106. If many downhole tools 106 are located in similar geographical locations, the surface operating system 112 may first determine that a particular communication channel 128 is associated with the downhole tool 106 being commanded. The surface operating system 112 may then transmit the machine-readable instructions to the downhole tool 106 by any suitable means. For example, the surface operating system may transmit electronic signal pulses through the earth formation 101, which may be received by the downhole tool 106. In response, the downhole tool 106 may process the downlink signals to effect a change in steering. For example, the downhole tool may change its steering mode (e.g., changing from build and turn mode to hold vertical inclination mode), direction, speed, drilling mode (e.g., a change in the speed of the drill bit 110), communication frequency, or the like.

At block 170, the surface operating system 112 may receive data from the downhole tool 106 including information about the performance of the command to the surface operating system 112. In some embodiments, the downhole tool 106 may continuously send data to the surface operating system 112. As described with reference to FIGS. 1 and 2, this data may be indicative of the natural properties of the earth formation 101, the status of the downhole tool 106, or the like. The surface operating system 112 may identify portions of this data as DPoints based on the relationships defined in the JSON contract 126. For example, if the selected command is related to causing a ten degree shift in the drill bit 110 of the downhole tool 106, the downhole tool 106 may respond with various data measurements, including information regarding the facial direction of its drill bit 110, which may be a DPoint that is associated with the selected command. The surface operating system 112 may evaluate the DPoints to determine whether the downhole tool 106 is successfully processing and performing the transmitted commands, whether there are any conditions (e.g., errors) preventing the downhole tool 106 from performing the command, whether additional commands may be beneficial, whether an additional command should be selected in response to the received data, or the like.

After block 170, the surface operating system 112 may return to block 151 or block 152 and await to receive an additional command. In some embodiments, additional commands may be received by user input (block 152). Alternatively, in other embodiments, additional commands may be selected automatically by the surface operating system 112. This may occur, for example, where AI algorithms are used to automatically select additional commands. Alternatively, certain commands may be automatically selected via coding conditions (e.g., programming statements to automatically initiate a command in response to data being received). As described with reference to block 151, the surface operating system 112 may use information included in the JSON contract 126 associated with a previous command to select an additional or subsequent command.

Figure 4:
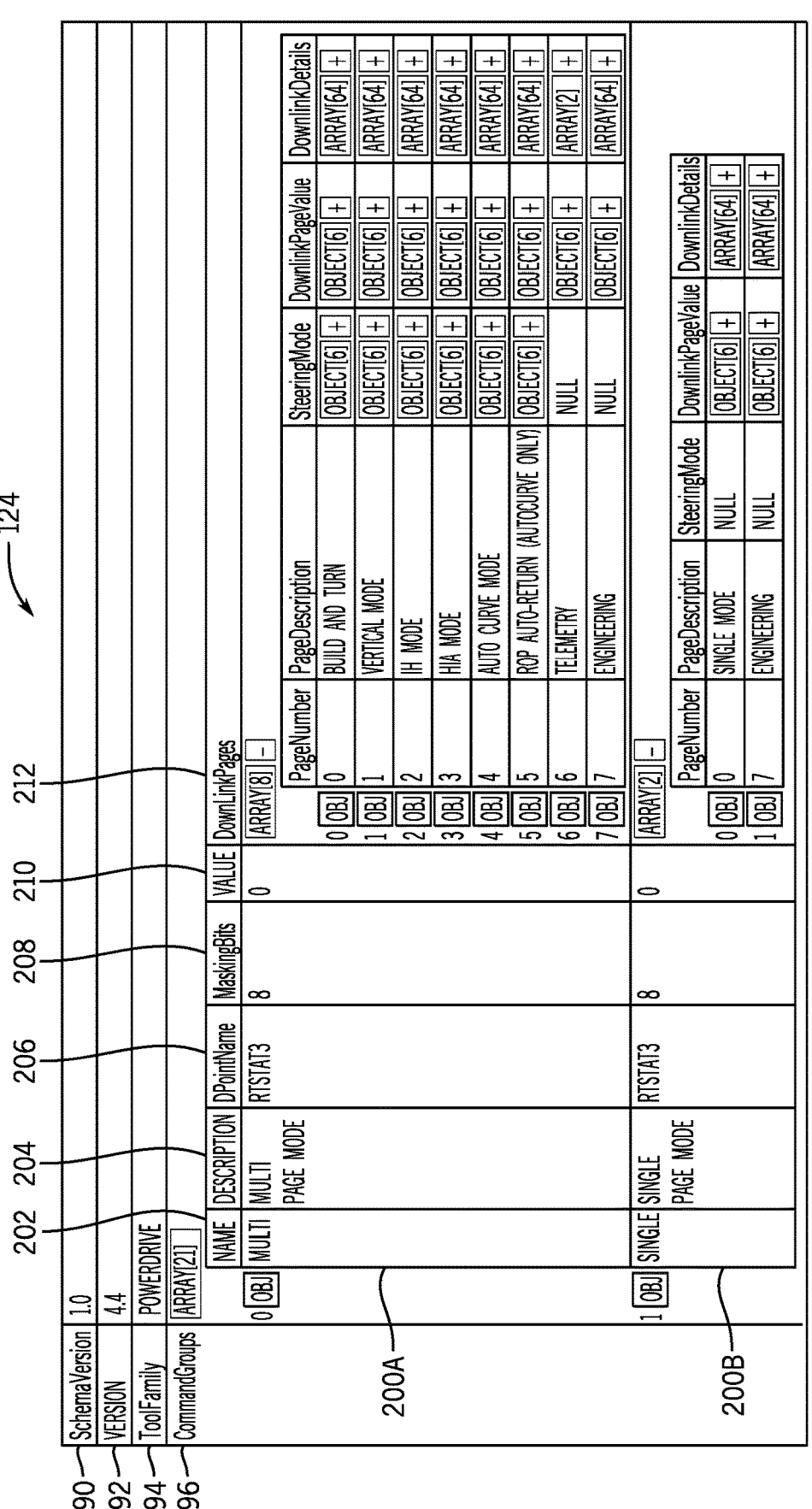
FIG. 4 is an example of a JSON schema for organizing commands, in accordance with an embodiment of the present disclosure.
Figure 5:
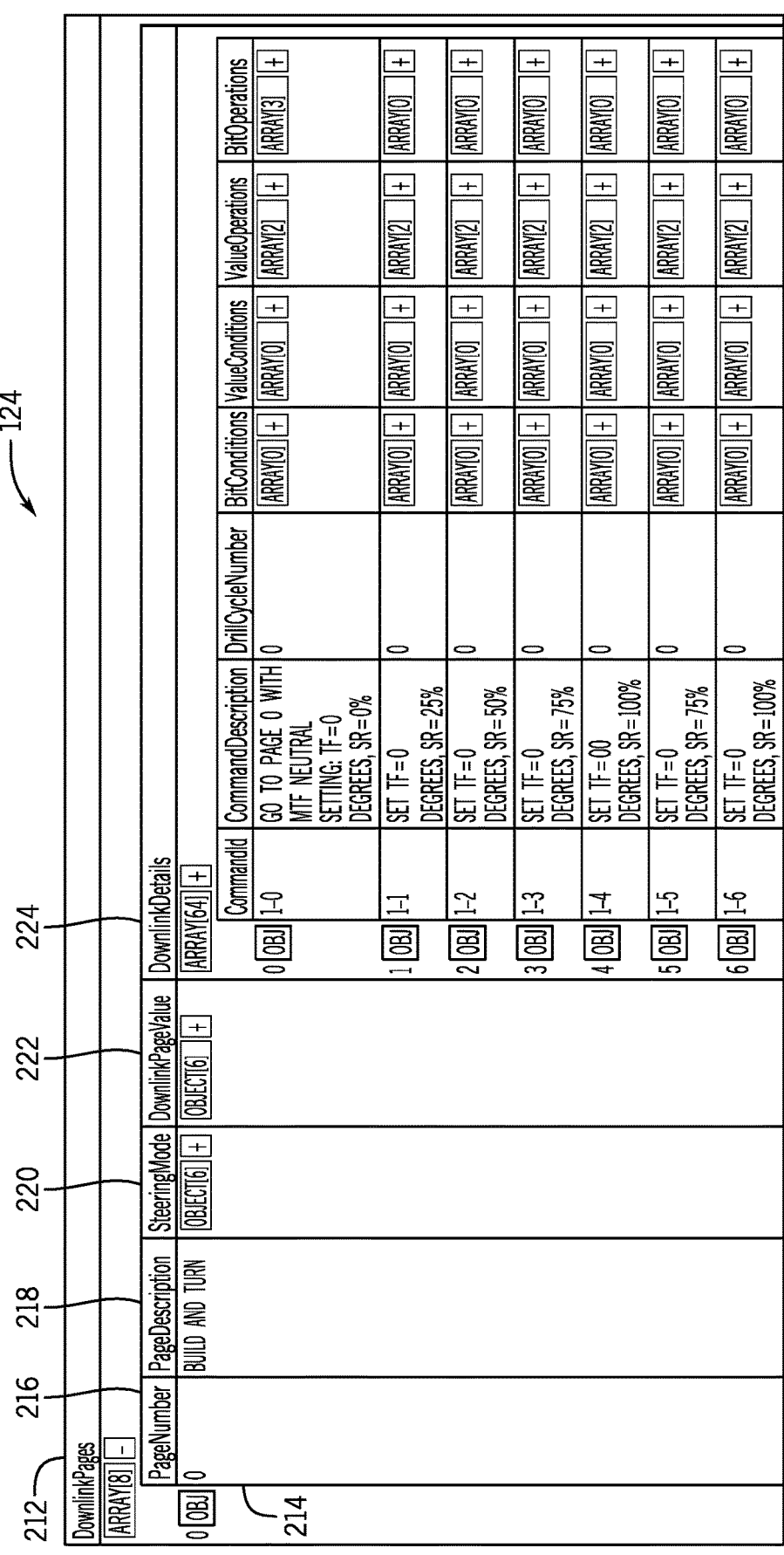
FIG. 5 is a continuation of the JSON schema of FIG. 4, in accordance with an embodiment of the present disclosure.
Figure 6:
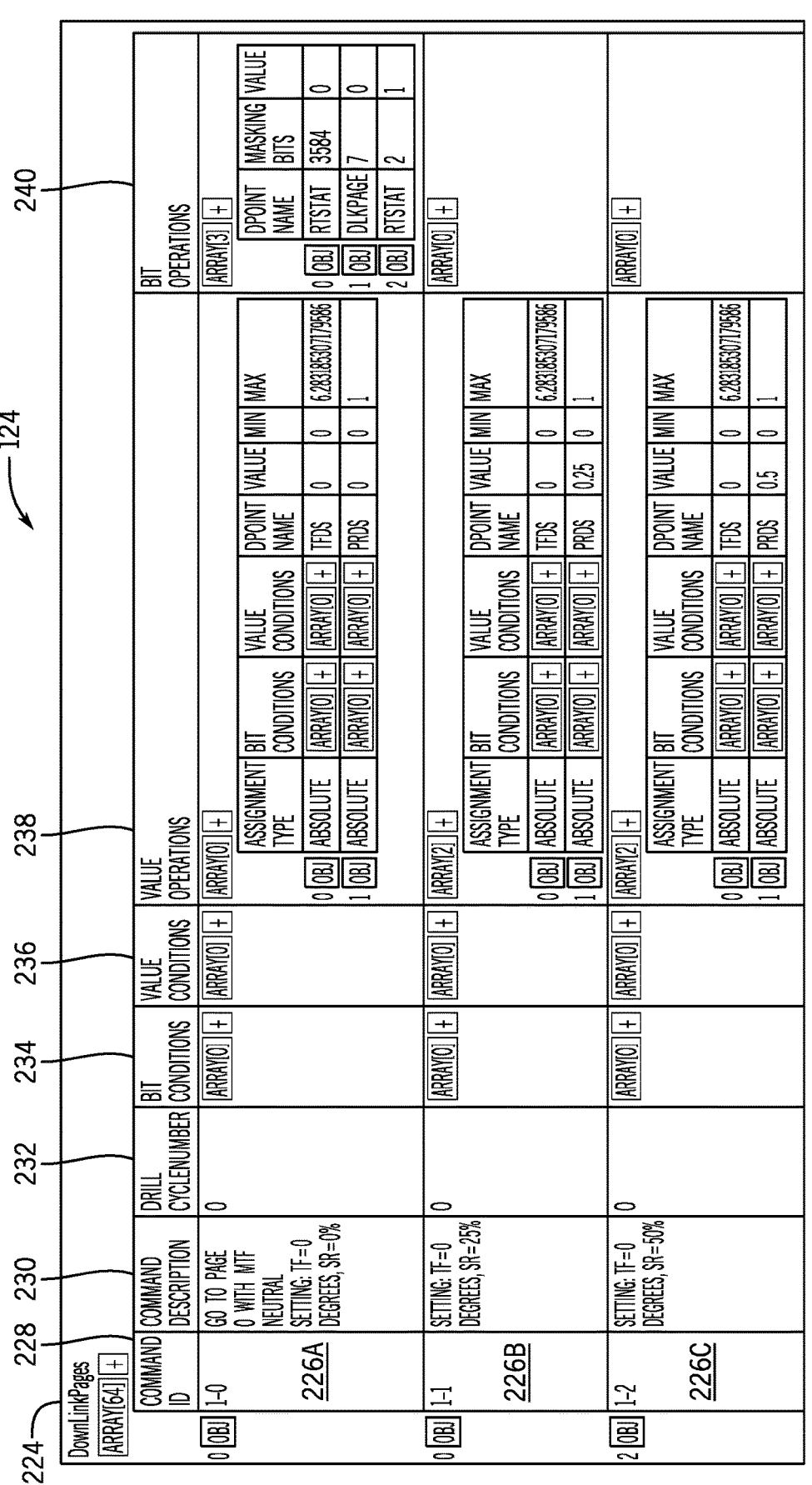
FIG. 6 is a continuation of the JSON schema of FIG. 5, in accordance with an embodiment of the present disclosure.

With the foregoing in mind, FIGS. 4-6 provide an example of a JSON schema 124 for organizing and maintaining JSON contracts 126. Specifically, FIGS. 4-6 depict different levels of the mapping of the JSON schema 124 for organizing the JSON objects that make up each command. FIG. 4, for example, is a diagram of a high level of the JSON schema 124. Although the depicted JSON schema 124 contains four levels associated with various data fields, additional levels and/or fields may also be defined. Likewise, in some cases fewer levels and/or fields may be defined. Further, it should be noted that each level of the JSON schema 124 may be made up of fields, with at least one of the fields in a particular level referring to a subordinate level of the JSON schema 124.

The first level of the JSON schema 124 may specify certain properties of the downhole tools 106. This level may include a JSON schema version 190. In this example, the schema version 190 is 1.0. However, the schema may be updated as new commands are added, new downhole tools 106 are developed, or the like. In some embodiments, the surface operating system 112 may access previous versions 190 of the JSON schema 124 to identify how it has changed over time. The first level of the JSON schema 124 may also contain tool information. For example, the schema may contain information regarding the version 192 of the downhole tool 106 and the tool family 194. Including tool properties, such as the schema version 190, tool version 192, and tool family 194, at the highest level of the JSON schema 124 may be useful for the maintaining organization in situations where the surface operating system 112 controls many downhole tools 106. The first level of the schema may also contain command groups 196.

The second level of the JSON schema relates to command groups 196. Commands may be grouped according to different characteristics associated with the desired behavior that the command is intended to cause. Many command group instances 200 may be specified. This example depicts two: a multipage command group 200A and a single page command group 200B. The multipage command group 200A may be useful, for example, for commands that span multiple downlink pages. Conversely, the single command group 200B may be associated with commands spanning a single downlink page.

The command groups level 196 may also include various fields related to the command groups. For example, the command groups may have text-based names 202 and descriptions 204. These features may be useful for maintaining organization in the JSON schema 124 when additional command group instances 200 are defined. For example, in some embodiments, dozens, hundreds, or any number of JSON command groups 200 may be defined. The command group level 196 may contain various additional fields to specify properties of each command group instance 200. For example, the command groups level may contain a DPoint field 206. The DPoint field 206 may provide a location that the surface operating system 112 can consult to identify the relevant data for a given command group instance 200. This DPoint data may be processed by the surface operating system 112 to determine the status of the downhole tool 106 and determine whether commands were performed.

The command groups level 196 may also contain additional information such as a masking bits field 208 and value field 210. These fields 208, 210 may be viewed as identifiers of each command group instance 200. For example, a masking bit 208 of eight and a value 210 of one may represent the single command group 200B. The command group level 196 may also include the downlink page level 212.

FIG. 5 provides a continuation of the JSON schema 124 with specific attention to the downlink page level 212. The commands may be stored as pages to promote organization and structure in the JSON schema 124. That is, the commands may be stored as pages according to common properties (e.g., purpose, expected behavior) of the commands. For example, the JSON schema 124 may include different pages of commands for different drilling modes (e.g., hold vertical mode, hold inclination, hold inclination azimuth). That is, each page of commands may be organized according to a tool status of each of the different drilling modes. In some embodiments, if there is only one steering mode corresponding to the page, the downlink pages may refer to the instructions (e.g., the downlink signals) that the surface operating system 112 transmits to the downhole tool 106 to affect a change in operation. That is, in some embodiments, certain downlink pages may be associated with a steering change for the downhole tool 106.

The downlink page level 212 may contain various page instances 214. Although one page instance 214 is presented here, the JSON schema 124 may contain any number of page instances 214. Because the downlink page level 212 may be subordinate to the command groups level 196 of FIG. 5, there may be different downlink page instances 214 for each command group instance 200.

The downlink page level 212 may include various fields. For example, each page may have an identification number 216 and a page description 218. These fields may promote organization and the identification of commands in the JSON schema 124. For example, the downlink page description 218 that associated with the first page instance 214 is described as "Build and Turn," which may be indicative of a downlink command that initiates a curved open loop drilling mode. The downlink page level 212 may also include a steering mode field 220 and a downlink page value field 222. As mentioned above, in cases where there is only one steering mode corresponding to the page, these fields 220, 222 may be parsed by the surface operating system 112 to determine the downlink signal to transmit to the downhole tool 106. In this way, the steering mode field 220 and downlink page value field 222 may define the operational change that the downhole tool is expected to experience. The downlink page level may also include the downlink details level 224.

FIG. 6 provides a continuation of the JSON schema 124 with specific attention to the downlink details level 224. The downlink details level 224 contains various information associated with the commands. Similarly to the downlink pages level 212, the downlink details level 224 may refer to the downlink signals that the surface operating system 112 transmits to the downhole tool 106 to affect a change in operation. In particular, the downlink details level 224 may include instructions for steering modes that correspond to multiple pages. Many different commands 226A, 226B, 226C may be specified at the downlink details level 224. Each command 226 may be associated with various fields related to steering the downhole tool 106, conditions associated with the command, and DPoints associated with the command. For example, the Command ID 228 may refer to the page identification number that determines the downlink signal that the downhole tool 106 receives. Likewise, the downlink details level may specify a command description field 230, which may include text-based descriptions of each command 226.

The downlink details level 224 may contain a drill cycle number 232, which indicates a time period for enacting a command. For example, if the drill cycle number 232 for a command 226 is five, the downhole tool 106 will enact that command for five drill cycles after it receives the downlink signal. Conversely, if the drill cycle number 232 is one, the downhole tool will enact the command for one drill cycle. The downlink details level 224 may also contain bit conditions 234 and value conditions 236, which may specify the conditions for the surface operating system to evaluate (e.g., as described with reference to blocks 160-164 in FIG. 3). Bit conditions 234 may refer to a bit string that makes up a particular DPoint that may define a condition associated with downhole tool 106, the drill bit 110, or other aspects of directional drilling. Value conditions 236 may refer more broadly to conditions associated with the downhole tool 106 and its steering operations.

The downlink details level may also define value operations 238 and bit operations 240. Value operations 238 may refer to a value associated with steering parameter to be changed (e.g., at a particular DPoint) in response to the command. By way of example, in response to a command, a tool face value (DPoint TFDS) of the downhole tool may change to 180 degrees. In another example, in response to an additional command, a steering ratio value (DPoint PRDS) of the downhole tool may change to 0.5 (50%). Bit operations 240 refer to the resulting change in the DPoint (e.g., at a machine code level) after applying the downlink command. For example, if a command is intended to change the steering mode of the downhole tool from inclination hold to hold inclination azimuth, one or more bits of a particular DPoint may be changed from 0 to 1. In this way, bit operations 240 may refer to the change in a bit string that makes up the particular DPoint, an expected change to the bit string of the particular DPoint in cases where the DPoint is being evaluated, or a combination of both. For example, when a downlink to change the steering mode from IH (inclination hold) to HIA (Hold inclination azimuth) is transmitted, bits 9 to 11 of the DPoint RTSTAT may be changed from 010 to 011.

The bit operations 240 may, therefore, indicate the received data that is expected from the downhole tool 106. This may be useful, for example, to determine whether the downhole tool performed a downlink-based command. In some embodiments, algorithms, such as AI algorithms, may be automatically used to compare the bit operation 240 DPoint with the data received by the downhole tool 106 to determine a course of action (e.g., terminating a command, selecting a superseding command). In this way, the value operations 238 and the bit operation 240 may represent related changes to a particular DPoint in response to a selected command.

The technical effect of the disclosed embodiments includes an improved technique for controlling downhole tools 106 and using data received from downhole tools 106. Indeed, defining commands according to JSON contracts 126 where the commands are associated with different steering modes, conditions, and DPoints provides a benefit. In particular, a surface operating system 112 can efficiently process data received by the downhole tool 106 to determine how the downhole tool 106 is behaving, identify the natural properties of the earth formation 101 around the downhole tool 106, and perform other analytical tasks. Defining commands in this manner may enable control devices to perform autonomous operations, such as drilling. Specifically, AI algorithms can be trained using the JSON contracts 126 to automatically select commands, define new commands, shift the conditions associated with commands, or perform similar autonomous functions. Moreover, structuring commands as JSON contracts 126 may enable the commands for various types and versions of downhole tools 106 to be parsed and tracked by one surface operating system 112. This promotes efficiency as downhole tools 106 are updated and commands are developed or changed. Thus, the disclosed techniques promote a computer-oriented means for controlling the operation of downhole tools 106 in a wellbore 102.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

The invention claimed is:

1. A method, comprising:

receiving, via a processing system, a selection of a command for a downhole tool disposed within a wellbore of a geological formation wherein the command is part of a plurality of commands associated with controlling one or more operations of the downhole tool;

retrieving, via the processing system, a JavaScript Object Notation (JSON) contract of a plurality of JSON contracts associated with the command from a JSON schema, wherein the JSON contract comprises a plurality of JSON objects configured to cause the downhole tool to perform the command, and wherein the JSON schema comprises a multi-level hierarchical mapping of the plurality of JSON contracts that is organized based on a first level comprising one or more characteristics of a plurality of downhole tools, a second level comprising a plurality of drilling operations, and a third level comprising a plurality of conditions associated with the downhole tool performing the plurality of drilling operations;

generating, via the processing system, a downlink signal based on the JSON contract;

transmitting, via the processing system, the downlink signal to the downhole tool while the downhole tool is disposed within the wellbore of the geological formation, wherein the downhole tool is configured to implement a change in the one or more operations of the downhole tool in response to receiving the downlink signal, and wherein the change in the one or more operations of the downhole tool comprises the downhole tool changing a steering mode, a drilling mode, a direction, a speed, or any combination thereof; and receiving, via the processing system, feedback data from the downhole tool after the downhole tool implements the command, wherein the feedback data comprises one or more measurements associated with the downhole tool implementing the command.

2. The method of claim 1, wherein the JSON contact comprises a page number associated with the downlink signal, one or more conditions associated with implementing the command, and one or more data points associated with a performance of the commands by the downhole tool.

3. The method of claim 1, comprising:

receiving, via the processing system, an additional selection of an additional command of the plurality of commands;

identifying, via the processing system, one or more conditions associated with the additional command;

in response to identifying the one or more conditions associated with the additional command, analyzing, via the processing system, the feedback data to determine whether the downhole tool satisfies the one or more conditions associated with the additional command;

in response to the feedback data indicating that the downhole tool satisfies the one or more conditions associated with the additional command, generating, via the processing system, an additional downlink signal based on the additional command; and transmitting, via the processing system, the additional downlink signal to the downhole tool.

4. The method of claim 3, comprising analyzing the feedback data to determine that one or more data points corresponding to one or more measurements acquired via the downhole tool satisfies the one or more conditions associated with the additional command.

5. The method of claim 4, comprising generating, via the processing system, the additional selection of the additional command based at least in part on applying an artificial intelligence (AI) algorithm to the feedback data to determine a status of the downhole tool implementing the command.

6. The method of claim 3, comprising in response to feedback data indicating that the downhole tool does not satisfy the one or more conditions associated with the additional command, generating, via the processing system, a suggestion for one or more alternative commands based on a similarity to the additional command, a current status of the downhole tool based on the feedback data, or both.

7. The method of claim 1, wherein the feedback data is at least partially based on electromagnetic measurements (EM) of the wellbore collected by an EM acquisition system of the downhole tool.

8. A system, comprising:

a downhole tool; and a surface operating system comprising processing circuitry configured to:

receive a selection of a command for the downhole tool disposed within a wellbore of a geological formation, wherein the command is part of a plurality of commands associated with controlling one or more operations of the downhole tool;

retrieve a JavaScript Object Notation (JSON) contract of a plurality of JSON contracts is associated with the command from a JSON schema, wherein the JSON contract comprises a plurality of a JSON objects configured to cause the downhole tool to perform the command, and wherein the JSON schema comprises a multi-level hierarchical mapping of the plurality of JSON contracts that is organized based on a first level comprising one or more characteristics of a plurality of downhole tools, a second level comprising a plurality of drilling operations, and a third level comprising a plurality of conditions associated with the downhole tool performing the plurality of drilling operations;

generate a downlink signal based on the JSON contract;

transmit the downlink signal to the downhole tool while the downhole tool is disposed within the wellbore of the geological formation, wherein the downhole tool is configured to implement a change in the one or more operations of the downhole tool in response to receiving the downlink signal, and wherein the change in the one or more operations of the downhole tool comprises the downhole tool changing a steering mode, a drilling mode, a direction, a speed, or any combination thereof; and receive feedback data from the downhole tool after the downhole tool implements the command, wherein the feedback data comprises one or more measurements associated with the downhole tool implementing the command.

9. The system of claim 8, wherein the JSON contract comprises a page number associated with the downlink signal, one or more conditions associated with implementing the command, and one or more data points associated with a performance of the command by the downhole tool.

10. The system of claim 8, wherein the downhole tool comprises an electromagnetic measurement (EM) acquisition system that is configured to collect electromagnetic measurements of the wellbore.

11. The system of claim 8, wherein the downhole tool comprises a logging-while-drilling (LWD) tool or a measurement-while-drilling (MWD) tool.

12. The system of claim 8, wherein the surface operating system is configurable to determine the feedback data based on processing one or more mud pulse telemetry signals transmitted by the downhole tool.

13. The system of claim 8, wherein the processing circuitry of the surface operating system is further configured to:

receive an additional selection of an additional command of the plurality of commands;

identify one or more conditions associated with the additional command; and in response to the feedback data indicating that the downhole tool does not satisfy the one or more conditions associated with the additional command, generate a graphical user interface (GUI) alert based on the feedback data indicating that the downhole tool does not satisfy the one or more conditions associated with the additional command, wherein the GUI alert comprises a suggestion for one or more alternative commands based on a similarity to the additional command, a current status of the downhole tool based on the feedback data, or both.

14. A non-transitory, computer-readable medium, comprising computer-readable instructions that, when executed by one or more processors of one or more computers, cause the one or more computers to:

receive a selection of a command for a downhole tool disposed within a wellbore of a geological formation, wherein the command is part of a plurality of commands associated with controlling one or more operations of the downhole tool;

retrieve a JavaScript Object Notation (JSON) contract associated with the command from a JSON schema, wherein the JSON contract comprises a plurality of JSON objects configured to cause the downhole tool to perform the command, and wherein the JSON schema comprises a multi-level hierarchical mapping of a plurality of JSON contracts that is organized based on a first level comprising one or more characteristics of a plurality of downhole tools, a second level comprising a plurality of drilling operations, and a third level comprising a plurality of conditions associated with the downhole tool performing the plurality of drilling operations;

generate a downlink signal based on the JSON contract;

transmit the downlink signal to the downhole tool while the downhole tool is disposed within the wellbore of the geological formation, wherein the downhole tool is configured to implement a change in the one or more operations of the downhole tool in response to receiving the downlink signal, and wherein the change in the one or more operations of the downhole tool comprises the downhole tool changing a steering mode, a drilling mode, a direction, a speed, or any combination thereof; and receive feedback data from the downhole tool after the downhole tool implements the command, wherein the feedback data comprises one or more measurements associated with the downhole tool implementing the command.

15. The non-transitory, computer-readable medium of claim 14, wherein the JSON contract comprises a page number associated with the downlink signal, one or more conditions associated with implementing the command, and one or more data points associated with a performance of the command by the downhole tool.

16. The non-transitory, computer-readable medium of claim 14, wherein the instructions, when executed by the one or more processors, further cause the one or more computers to:

receive an additional selection of an additional command of the plurality of commands;

identify one or more conditions associated with the additional command;

in response to identifying the one or more conditions associated with the additional command, analyze the feedback data to determine whether the downhole tool satisfies the one or more conditions associated with the additional command; and in response to the feedback data indicating that the downhole tool satisfies the one or more conditions associated with the additional command:

generate an additional downlink signal based on the additional command; and transmit the additional downlink signal to the downhole tool; or in response to the feedback data indicating that the downhole tool does not satisfy the one or more conditions associated with the additional command:

generate a graphical user interface (GUI) alert based on the feedback data indicating that the downhole tool does not satisfy the one or more conditions associated with the additional command.

17. The non-transitory, computer-readable medium of claim 16, wherein the GUI alert comprises a suggested alternative command.

18. The non-transitory, computer-readable medium of claim 17, wherein the suggested alternative command is based on a similarity to the additional command, the feedback data, or any combination thereof.

19. The non-transitory, computer-readable medium of claim 16, wherein the instructions, when executed by the one or more processors, further cause the one or more computers to generate the additional selection of the additional command based at least in part on applying an artificial intelligence (AI) algorithm to the feedback data to determine a status of the downhole tool implementing the command.

20. The non-transitory, computer-readable medium of claim 14, wherein the instructions, when executed by the one or more processors, further cause the one or more computers to update the JSON schema to include one or more additional JSON contracts associated with a new downhole tool or a new version of one of the plurality of downhole tools.

* * * * *